(12) United States Patent
Betscher et al.

(10) Patent No.: US 11,764,013 B2
(45) Date of Patent: Sep. 19, 2023

(54) ELECTRICAL DISCONNECTING DEVICE, SYSTEM COMPRISING A DISCONNECTING DEVICE, AND METHOD FOR PRODUCING A DISCONNECTING DEVICE

(71) Applicant: Auto-Kabel Management GmbH, Hausen i.W. (DE)

(72) Inventors: Simon Betscher, Grevenbroich (DE); Markus Moszynski, Erkelenz (DE); Philipp Dohrmann, Mönchengladbach (DE)

(73) Assignee: Auto-Kabel Management GmbH, Hausen i. W. (DE)

( * ) Notice: Subject to any disclaimer, the term of this patent is extended or adjusted under 35 U.S.C. 154(b) by 0 days.

(21) Appl. No.: 17/924,884

(22) PCT Filed: Apr. 21, 2021

(86) PCT No.: PCT/EP2021/060305
§ 371 (c)(1),
(2) Date: Nov. 11, 2022

(87) PCT Pub. No.: WO2021/228518
PCT Pub. Date: Nov. 18, 2021

(65) Prior Publication Data
US 2023/0197382 A1 Jun. 22, 2023

(30) Foreign Application Priority Data
May 13, 2020 (DE) .................... 10 2020 112 918.1

(51) Int. Cl.
*H01H 39/00* (2006.01)
*H01R 13/70* (2006.01)
(Continued)

(52) U.S. Cl.
CPC ........ *H01H 39/006* (2013.01); *H01M 50/574* (2021.01); *H01R 13/502* (2013.01);
(Continued)

(58) Field of Classification Search
CPC ................. H01H 39/00; H01H 39/006; H01H 2039/008; H01M 50/574; H01R 11/12;
(Continued)

(56) References Cited

U.S. PATENT DOCUMENTS

| 6,556,119 | B1 * | 4/2003 | Lell ...................... H01H 37/323 337/182 |
| 2010/0328014 | A1 * | 12/2010 | Suzuki ................. H01H 39/006 337/30 |

(Continued)

FOREIGN PATENT DOCUMENTS

| DE | 10337958 A1 | 8/2004 |
| DE | 102010045726 A1 | 3/2012 |
| FR | 3014594 A1 | 6/2015 |

OTHER PUBLICATIONS

International Searching Authority/EP, International Search Report and Written Opinion of the International Searching Authority, Application No. PCT/EP2021/060305, dated Aug. 25, 2021, 13 pages.

(Continued)

*Primary Examiner* — Jacob R Crum
(74) *Attorney, Agent, or Firm* — Sunstein LLP

(57) ABSTRACT

An electrical disconnecting device comprising a housing, a first terminal lug (4*a*) inserted into the housing, a second terminal lug (4*b*) inserted into the housing, a current path forming between the first and second terminal lugs (4*a*, 4*b*) in a closed state, a separation point (6) spatially located between the terminal lugs, the separation point (6) disconnecting the current path between the terminal lugs (4*a*, 4*b*)

(Continued)

in the separated state, a actuator (8) influencing a separation of the separation point (6), a channel formed in the housing between the actuator (8) and the separation point (6), the actuator closing the channel on a side facing away from the separation point, and a connecting element which is arranged on the side of the actuator facing away from the channel and accommodates at least two electrical connections of the actuator, characterized in that the connecting element accommodates at least two contact elements of a switching path, in that the contact elements are each guided into the channel via connecting webs and are short-circuited to one another in the channel at a connecting point in such a way that, when the actuator is triggered, the connecting point is moved away from the contact elements, so that the connecting webs are mechanically disconnected.

14 Claims, 11 Drawing Sheets

(51) Int. Cl.
| | | |
|---|---|---|
| *H01R 13/502* | (2006.01) | |
| *H01M 50/574* | (2021.01) | |
| *H01R 11/12* | (2006.01) | |

(52) U.S. Cl.
CPC ....... *H01R 13/70* (2013.01); *H01H 2039/008* (2013.01); *H01R 11/12* (2013.01); *H01R 2201/26* (2013.01)

(58) Field of Classification Search
CPC ... H01R 13/70; H01R 13/502; H01R 2201/26
See application file for complete search history.

(56) References Cited

U.S. PATENT DOCUMENTS

| | | |
|---|---|---|
| 2012/0194954 A1 | 8/2012 | Fukuyama et al. |
| 2013/0056344 A1 | 3/2013 | Borg |
| 2013/0263714 A1* | 10/2013 | Ukon .................. B23D 35/002 83/639.1 |
| 2019/0184834 A1* | 6/2019 | Hammerschmidt ... H01H 39/00 |
| 2020/0203102 A1* | 6/2020 | Sakai .................. H01H 39/006 |

OTHER PUBLICATIONS

German Patent Office, Office action that issued for priority application No. 10 2020 112 918.1, dated Dec. 14, 2020, 6 pages (in German).

* cited by examiner

ELECTRICAL DISCONNECTING DEVICE, SYSTEM COMPRISING A DISCONNECTING DEVICE, AND METHOD FOR PRODUCING A DISCONNECTING DEVICE

CROSS-REFERENCE TO RELATED APPLICATIONS

This application is the national phase entry of international patent application no. PCT/EP2021/060305 filed Apr. 21, 2021 and claims the benefit of German patent application No. 10 2020 112 918.1 filed May 13, 2020, the disclosures of which are incorporated herein by reference in their entirety.

Technical Field

The subject matter relates to an electrical disconnecting device, in particular for a 48 V vehicle electrical system, a system with such an electrical disconnecting device, in particular as part of a 48 V vehicle electrical system, and also a method for producing a disconnecting device.

Background Art

Disconnecting devices, in particular pyrotechnic disconnecting devices, for cutting a battery line, in particular under load, are sufficiently known. In the known solutions, separation bits or separation bolts are accelerated towards a separation point by a actuator, in particular a pyrotechnic actuator. Through their kinetic energy, cutting tools or separation pins mechanically cut open the separation point.

For separation under load, for example, it has already been suggested that the separation point is surrounded by a liquid medium, as described for example in the German patent application DE 10 2010 035 648.

However, the disconnecting devices known to date for 48 V vehicle electrical systems have the disadvantage that they are always formed for connection to an airbag control line. For this purpose, the plug mimics of pyrotechnical airbag control systems must be used, which are severely limited in terms of their functionality, in particular only allowing a 2-pin connection with which the ignition pellet can be ignited.

However, in the event of a crash or other damage, it is not only necessary to disconnect the energy line, but it may also be necessary to disconnect a signal path at the same time. In addition, there may be a desire to tap the battery potential, in particular the B+ potential, which is present at the disconnecting element anyway, especially for a connection to a battery sensor.

The subject matter was therefore based on the object of providing an electrical disconnecting device which can be easily manufactured while providing extended functionalities.

SUMMARY OF THE INVENTION

First of all, the electrical disconnecting device is substantially conventionally shaped with respect to its disconnection of the energy conductor.

To this end, the disconnecting device has a housing. The housing accommodates a first terminal lug as well as a second terminal lug. The terminal lugs may extend from the housing and may be formed as terminals, flat leads, contact pins, crimp contacts, terminal pins, and the like for connection to electrical leads.

The terminal lugs can be bimetallically coated outside the housing, have a connection pin, have a hole or be formed in the like in order to be contacted with an electrical conductor by means of a substance-to-substance bond, by means of welding or soldering, by means of a form fit and/or by means of a force fit, for example by means of screwing, crimping or the like.

The terminal lugs can be made of a metallic material, preferably copper or copper alloys as well as aluminum or aluminum alloys.

Within the housing, the terminal lugs are electrically conductively connected to each other in a closed state of the disconnecting device and form a current path in the closed state. This current path is formed between the first and second terminal lugs, such that a current can flow from the first terminal lug via the current path to the second terminal lug.

Along the current path, a separation point spatially located between the terminal lugs is provided inside the housing. The separation point may be a taper, predetermined separation point or the like at the connection between the terminal lugs. The separation point may be a notch that tapers the terminal lugs. The separation point may also be formed by means of a solder between the terminal lugs, which are spaced apart without the solder. The separation point forms a gap between the terminal lugs when separated. This gap then prevents current flow between the terminal lugs.

Predefined bending lines can be specified at the terminal lugs, for example by machine pre-stamping or the like. This enables a predetermined bending line of the terminal lugs in the event of separation.

In order to separate the terminal lug from each other, i.e. to be able to separate the disconnecting device under load, a actuator influencing a separation of the separation point is proposed. This actuator exerts a force on a disconnecting element and/or the separation point in order to open the separation point and thus separate the terminal lugs from each other. In the present case, the actuator is arranged in a channel formed in the housing.

The housing has a so-called weft channel, which is bounded on one side by the separation point and the terminal lugs and on the other side by the actuator. The channel is formed at least between the actuator and the separation point.

A disconnecting element can also be provided in the channel between the actuator and the separation point, which can be accelerated by the actuator in the direction of the separation point. The disconnecting element can be formed as a pin or disconnecting chisel. It is also possible for the actuator to act directly on the separation point.

A substantially incompressible medium, in particular a pasty or liquid medium, or a compressible medium such as a noble gas or an arc-extinguishing gas, such as SF6, may be provided in the channel.

On the side of the separation point facing away from the channel, the housing can have a receiving volume for the terminal lugs that are bent apart. When the actuator acts on the terminal lugs, they are pressed away from the actuator into this receiving volume. The same medium can be in the receiving volume as in the channel.

The medium immediately extinguishes an arc forming in the gap. If the separation point is opened under load, an arc is formed at the separation point via the gap formed, which is extinguished by the medium after separation.

For connecting the actuator, in particular for electrical ignition or activation of the actuator, a connecting element is provided on the side of the actuator facing away from the channel, which accommodates at least two connections of the actuator.

The connecting element is now formed not only to receive the connections of the actuator, but also to receive two contact elements of a switching path. A switching path is formed along the disconnecting device in addition to the path between the terminal lugs in order to be opened in the event of the disconnecting device being triggered. Starting from the connecting element, the contact elements of the switching path are each guided into the channel via connecting webs. That is, starting from the connecting element, the contact elements are guided into the channel via webs.

The connecting element can be essentially tubular. The actuator can be arranged on the inside of the tube, in the volume spanned by the tube, which is preferably cylindrical. The actuator can be positively engaged there and sealed, for example, by means of an O-ring, so that in the event of a pyrotechnic actuator being triggered, a pressure loss via the connecting element is avoided or reduced and the gas pressure generated by the actuator can act on the separation point.

The connecting webs may be located along the outer lateral surface of the connecting element. The contact elements are preferably within the volume circumscribed by the connecting element, are guided from there through the wall of the connecting element and merge into the connecting webs at the outer lateral surface of the connecting element. Starting from the outer lateral surface of the connecting element, the connecting webs are guided into the channel. Inside the channel, the connecting webs are short-circuited to one another at a connecting point. The connecting point may be formed in the manner of a current bridge.

When the actuator is triggered, not only is the separation point opened, but because the connecting point is inside the channel, the connecting point is also opened. When the actuator is triggered, the connecting webs are mechanically separated. The actuator moves the connecting point away from the contact element, so that the connection webs are mechanically separated and thus a separation of the connection between the two contact elements is effected within the connection element.

Thus, in the present case, when the actuator is triggered, on the one hand the separation point is mechanically opened and, on the other hand, the short circuit formed by the connecting point between the contact elements is broken.

According to one embodiment, it is proposed that, in addition to the contact elements, the connecting element also accommodates a battery contact. Thus, within the connection element, in particular within the volume enclosed by the connection element, at least one battery contact is additionally provided in addition to the connections of the actuator and the two contact elements. In the present case, the battery contact is short-circuited to one of the terminal lugs via a connecting web. Preferably, the battery contact extends through the wall of the connection element and is guided to the terminal lug by a connecting web that runs along the outside of the connection element. The connecting web of the battery contact may be formed in accordance with the connecting webs of the contact elements and guided along the connecting element. The connecting web of the battery contact can be s-shaped or arc-shaped in the direction of the battery contact. This allows the connecting web to deform elastically to provide tolerance compensation.

It has been recognized that "clean" battery B+ potential is generally present at the terminal lugs. In a motor vehicle, the electrical disconnecting device is generally provided in the immediate vicinity of the battery terminal in order to be able to disconnect the battery from the vehicle electrical system in the event of a crash. Since the terminal lugs are thus directly connected to the battery terminal, the battery potential is applied to the terminal lugs without distortion. In order to be able to measure the battery status using a battery sensor, it must be possible to measure the battery potential as accurately as possible. This can be done by means of the present battery contact, which can be contacted within the connecting element and via which the battery potential can be tapped.

The battery contact is short-circuited with one of the terminal lugs, to which the B+ potential or the B− potential of the battery is usually applied in the installed state. An objective disconnecting element is usually connected high-side of the battery, so that the B+ potential is present at the terminal lugs. However, it is also possible that the isolating element is additionally or alternatively connected to the low-side potential of the battery, where the B potential can be tapped. The battery sensor connected to the battery contact can pick up the battery potential without falsification, since there is usually no other component between the terminal lug and the battery terminal in the installed state that could falsify the measurement of the battery potential. Only a short connecting cable, if any, is located between the terminal lug and the battery pole.

According to an embodiment, the connecting element is formed as a plug contact, in particular as a plug or socket. In this case, the connecting element is preferably formed with an inner region and an outer region. An outer lateral surface of the connecting element encloses the volume of the inner region of the connecting element. Both the connection between the connecting webs and the contact elements, as well as between the connecting web and the battery contact, can be guided through this outer lateral surface. Thus, a connection can be formed from the interior of the connecting element to the exterior of the connecting element.

The connecting webs run along the outer lateral surface. Two connecting webs preferably run parallel to the longitudinal direction of the connecting element towards the connecting point, and a third connecting web runs parallel to the longitudinal extension of the connecting element towards a connecting point with a terminal lug.

According to one embodiment, it is proposed that the housing is multi-part. Thereby, at least the terminal lugs and the separation point may be in a first housing part. Within this first housing part, the channel may be at least partially formed. In longitudinal extension of the channel, the connecting element may be arranged and form a second housing part. The connecting element may close off the channel. The connecting element may also initially continue the channel in its volume enclosed by its shell surface. Inside the connecting element, the actuator may be arranged at least in parts.

In order to prevent built-up pressure from escaping through the connecting element in the event of the actuator being triggered, the connecting element is arranged in or on the channel, radially sealing the channel.

According to one embodiment, it is proposed that the connecting element has a longitudinally extending through-opening and that in the through-opening the actuator is arranged radially sealing the through-opening. The connecting element can be received in the channel in the longitudinal extension of the channel. The connecting element extends into the through opening, which becomes part of the channel. Closing the channel, the actuator may be disposed within the through opening of the connecting element. The through opening may be formed to receive the two terminals of the actuator. Thus, the actuator can be inserted into the through-opening with its two ports ahead.

A perforated wall may be provided within the through opening, within which openings are provided to receive the terminals of the actuator. In the inserted state, the terminals of the actuator then extend through the wall into the side of the connecting element facing away from the channel and form contact pins of the plug-in contact of the connecting element.

According to one embodiment, it is proposed that a flowable medium, in particular a gel-like medium, is arranged in the channel between the actuator and the separation point and that the medium flows around the separation point immediately after disconnection thereof. As explained at the outset, the medium preferably has arc-extinguishing properties, so that when the separation point is separated under load, the medium immediately extinguishes the resulting arc.

According to one embodiment, it is proposed that the terminals, the contact elements and/or the battery contact are arranged as contact pins within the connection element, preferably within the plug-in contact of the connection element. Thus, the connection element serves as a uniform connection mimic for the electrical connection on the one hand of the actuator, on the other hand of a battery sensor and thirdly of a separable signal or measurement path.

To separate the connection element from the connecting webs, the connection element must be mechanically moved away from the contact elements when the actuator is triggered, in particular by a transverse movement. To initiate this movement, a force directed away from the contact elements must be applied to the junction. For this purpose, it is proposed that the connecting point is hinged to the actuator.

The actuator may be formed by an actuator and a bolt. In particular, the actuator may be a pyrotechnic actuator. In this case, the actuator may have a pyrotechnic ignition pellet.

On the output side of the pyrotechnic primer, directed towards the channel, on the side facing away from the connections of the actuator, a bolt may be arranged on the pyrotechnic primer. The bolt may also be in the form of a sleeve enclosing the priming pellet at its outer lateral surface and thus resting against the priming pellet in a U-shape in a longitudinal section. For its part, the bolt can be sealed at its outer lateral surface with respect to the inner lateral surface of the channel. A circumferential seal, in particular a sealing ring, can be provided for this purpose. When the priming pellet is triggered, in particular when an electrical pulse is applied to the terminals, the priming pellet explodes and an explosion gas is formed abruptly. This explosion gas builds up a pressure which causes the bolt to accelerate towards the separation point.

Now, if the connecting webs are fixed to the fastener and the joint is hinged to the bolt, relative movement of the bolt to the fastener causes movement of the joint away from the connecting web. This force may be sufficient to split the connecting webs.

For mechanically linking the connecting point to the actuator, it is suggested that the connecting point is positively arranged, in particular fastened, to the bolt. The connecting point can also be arranged on the end face of the bolt facing the separation point. The connecting point may project radially inwardly into the end face.

A particularly simple design is formed by the bolt having a radial recess. This may be in the form of a groove. The groove may be secant-shaped or may be arranged partially as well as completely circumferentially on the bolt. The bolt may be T-shaped in a longitudinal section. In particular, the groove may be provided only in an angular section in which the joint is arranged. The area of the bolt forming the groove and pointing axially in the direction of the separation point can have the same radius all around or, for example, have a smaller radius in an angular section in which the connecting point is not arranged than in the angular section in which the connecting point is arranged. If the joint is arranged in the groove, it can be "trapped" in the groove after shearing from the connecting webs. This prevents the sheared-off connecting point from coming into contact with the separated contact tabs.

The actuator may be arranged in the connecting element. Parts of the actuator, in particular parts of the bolt, may face in the direction of the channel from the through opening of the connecting element. In an end-face region of the bolt, the radial recess for receiving the connecting point can be arranged.

The connecting webs may be guided on the connecting element, in particular on the outer lateral surface of the connecting element. The connecting webs preferably extend beyond the end face of the connecting element in the direction of the channel and may then be curved radially inwards. However, the connecting webs can also extend externally along the longitudinal axis of the connecting element and only be guided in the direction of the channel in the region of the end face of the connecting element, through the lateral surface of the connecting element, in which case the connecting webs run in a radially inwardly curved manner. In both cases, the connecting webs, or the joint formed between the connecting webs, engage the groove or abut the end face of the bolt. It is therefore proposed that the connecting webs are arranged at an angle to the recess, in particular in the longitudinal direction of the channel, on the housing, preferably the connecting element.

If the bolt is accelerated relative to the connecting point by the actuator, the bolt will take the connecting point arranged thereon with it and tear open the connection webs. This causes a separation between the contact elements. A signal or measurement path formed in this way is thus severed when the actuator is triggered.

Particularly simple assembly is possible in that the contact elements and/or the battery contact are formed in a common punched grid. This punched grid can be inserted into the connection element during assembly or provided in the injection mold during injection molding of the connection element. The stamped grid can, on the one hand, form the contact pins in the space enclosed by the connecting element and, on the other hand, run along the outer lateral surface of the connecting element.

After the stamping grid has been mounted on the connecting element, the latter can be unraveled so that an electrical contact initially formed in the stamping grid between the contact elements themselves and with the battery contact is unraveled. This can be done, for example, by unraveling by means of a laser or by milling. After unraveling, the connecting webs that were initially connected to each other in the stamping grid are separated from each other.

According to an embodiment example, it is proposed that the contact elements with the connecting webs on the one hand and the connecting point on the other hand are installed independently of each other in the connection element. As previously explained, the contact elements together with the connecting webs may be formed together in a punched grid. The contact elements and connecting webs can also be formed as individual wires in the connecting element. In addition to the contact elements and connecting webs on the one hand, an additional wire or an additional punched grid is arranged as a connecting point on/in the connecting element. After both the contact elements together with the connecting webs and the connecting point have been fixed in or to the connecting element, these two elements can be electrically conductively connected to each other, for example soldered or glued.

According to an embodiment, it is proposed that the contact elements with the connecting webs on the one hand and the connecting point on the other hand are installed as one component in the connection element. As previously explained, the contact elements together with the connecting webs may be formed together in a stamped grid. The contact elements and connecting webs can also be formed as individual wires in the connecting element. The connecting point may be arranged directly on the connecting webs, in particular in one piece. The connecting point may initially be bent radially outward in the stamped grid so that it protrudes from the connection element. After the actuator is mounted, the joint may be bent in the direction of the actuator so that it abuts the actuator as described.

In another aspect, a system includes a disconnecting device as previously described and at least two automotive battery cables, wherein a first battery cable is connected to the first terminal lug and a second battery cable is connected to the second terminal lug. Preferably, the terminal lug facing the battery terminal is the one to which the battery contact is attached. The battery contact may be electrically conductively connected to a terminal lug by means of soldering or other methods after the connecting element has been attached to the channel. An electrical potential of the battery may be tapped via the battery contact and supplied to a battery sensor.

In another aspect, there is provided a method according to claim 15, in which method at least a portion of the housing is formed from a plastic, for example by injection molding. Receptacles for the first and second terminal lugs are provided in the housing, in particular a first housing part, wherein the terminal lugs are connected to each other via a separation point. The terminal lugs are inserted into the housing. In addition to a first housing part, a second housing part can be formed as a connecting element. This connecting element may be at least partially tubular. The connecting element has a longitudinally continuous opening, which may be interrupted by a center wall. On one side of the center wall, facing the first housing part, a actuator can be inserted.

The connecting element can be inserted into the first housing element with this side. This can form a channel which, starting from the actuator, is directed in the direction of the separation point. The actuator closes the connecting element, in particular the channel, for example by means of a seal. Connections of the actuator break through the center wall and are arranged on a side of the center wall facing away from the channel. As explained, a center wall can be drawn into the connecting element. Through-holes may be provided in this center wall, through which the connections of the actuator may be inserted.

The actuator can be arranged in a latching manner in the interior of the connecting element. On the side of the center wall facing away from the actuator, two contact elements of a measuring or switching path can be provided in the volume circumscribed by the connecting element. These contact elements are each guided into the channel via connecting webs and short-circuited to one another there by means of a connecting point. The connecting point is arranged in the channel in such a way that when the actuator is triggered, the connecting point is moved away from the contact elements so that the connection webs are mechanically separated. On the side of the center wall facing away from the actuator, a contact element of a battery contact can be provided in the volume circumscribed by the connecting element. This contact element is guided via connecting webs to one of the terminal lugs, where it is short-circuited to the terminal lug.

BRIEF DESCRIPTION OF THE DRAWINGS

In the following, the subject matter is explained in more detail with reference to drawings showing embodiments. The drawings show.

DETAILED DESCRIPTION OF SPECIFIC EMBODIMENTS

Figure 1A:
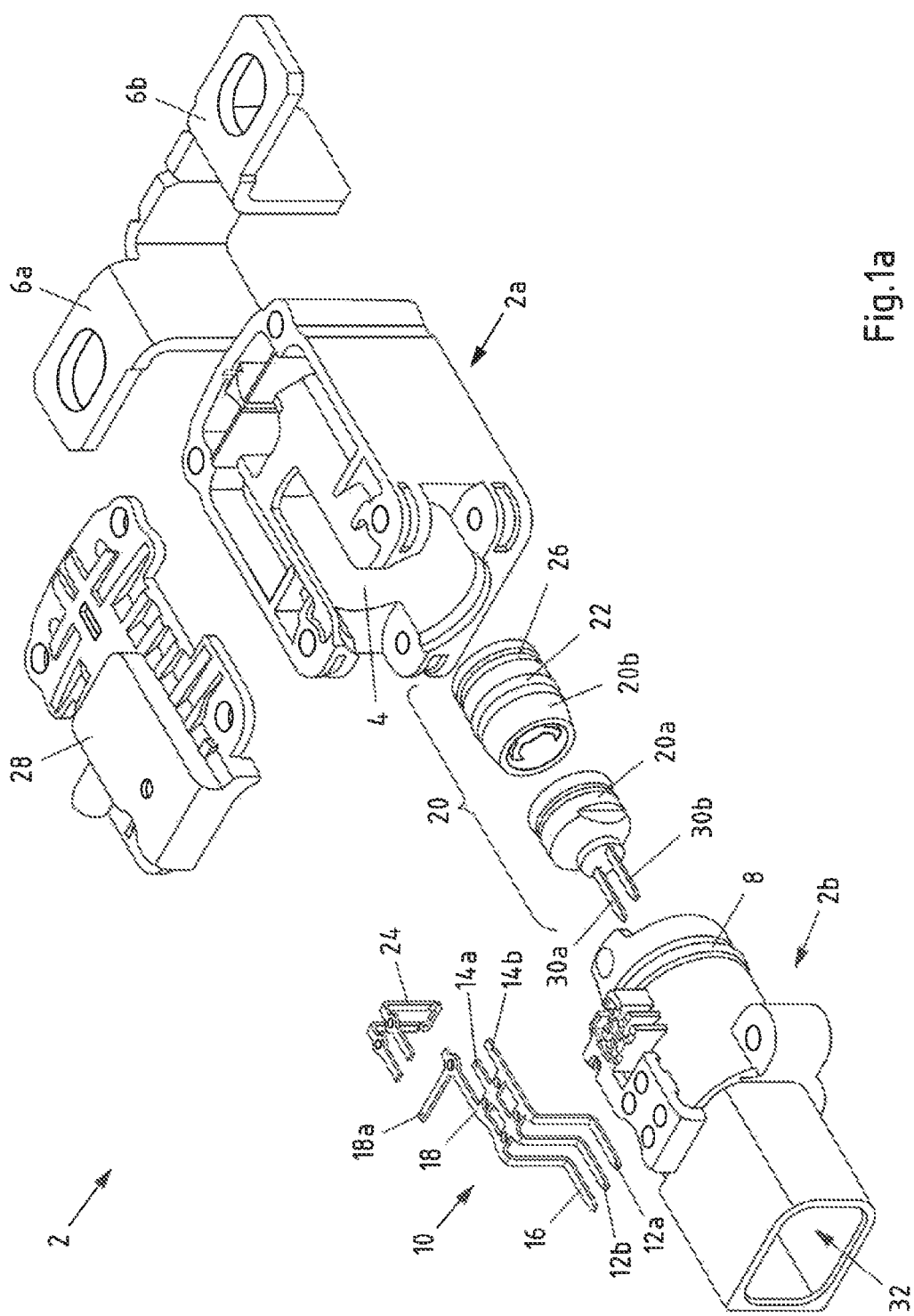
FIG. 1a an exploded view of a disconnecting device according to an embodiment.

FIG. 1a shows an exploded view of a disconnecting device 2. The disconnecting device 2 comprises a first housing element 2a and a connecting element 2b formed as a second housing element. As will be shown below, the housing elements 2a, b are plugged together.

A channel 4 may be formed in the first housing element 2a. The channel 4 may be bounded on one side by terminal lug 6a, b. On the other side of the channel 4, the connecting element 2b can be inserted into the first housing element 2a in a form-fitting manner, thus closing the channel 4.

An outer circumferential surface of the connecting element 2b is congruent with a receiving volume on the channel 4. A sealing element 8, for example an O-ring, can be provided on the connecting element 2b to close the channel 4. A punched grid 10 may be provided in or on the connecting element 2b. On the one hand, the punched grid 10 has two contact elements 12a, b and two connecting webs 14a, b.

On the other hand, the punched grid 10 has a battery contact 16 with a connecting web 18. The connecting webs 14a, b, 18 are still connected to each other in the punching grid, but are subsequently separated, as will be shown. The connecting web 18 has a terminal lug 18a for connection to the terminal lug 6a.

The connecting element 2b has an opening on the side facing the channel 4, into which an actuator 20 with a pyrotechnic actuator 20a and a bolt 20b can be inserted. For sealing the inner volume of the connecting element 2b with respect to the channel 4, another sealing element 22, for example an O-ring, may be provided.

For connecting the contact elements 12a, b to each other, a connecting point 24 is provided, for example as a contact bridge, wire bridge or the like, which may also be formed as a stamped grid. This junction 24 may be angularly shaped and engaged with a groove 26 of the bolt 20b, as will be shown below.

A lid 28 is provided to close the housing. Lid 28, first housing member 2a and connecting member 2b may each be a separate injection molded part. The materials of the injection molded parts may be different, for example, an impact resistance of the material of the first housing member 2a may be greater than that of the connecting member 2b. The impact resistance of the cover 28 may preferably be in accordance with the impact resistance of the first housing element 2a.

On one hand, the pyrotechnic actuator 20a may receive the bolt 20b and point in the direction of the channel 4 in the inserted state. On a side facing away from the bolt 20b, the pyrotechnic actuator 20a has connections 30a, b. When the pyrotechnic actuator 20a is inserted into an opening of the connecting element 2b, the connections 30a, b can be pushed through a center wall and end in a bushing-shaped receptacle 32 of the connecting element 2b.

The contact elements 12a, b as well as the battery contact 16 can be guided through the outer lateral surface of the connection element 2b and also end in the socket-shaped receptacle 32. The bushing-shaped receptacle 32 of the connection element 2b is shown in a top view in FIG. 2.

Figure 1B:
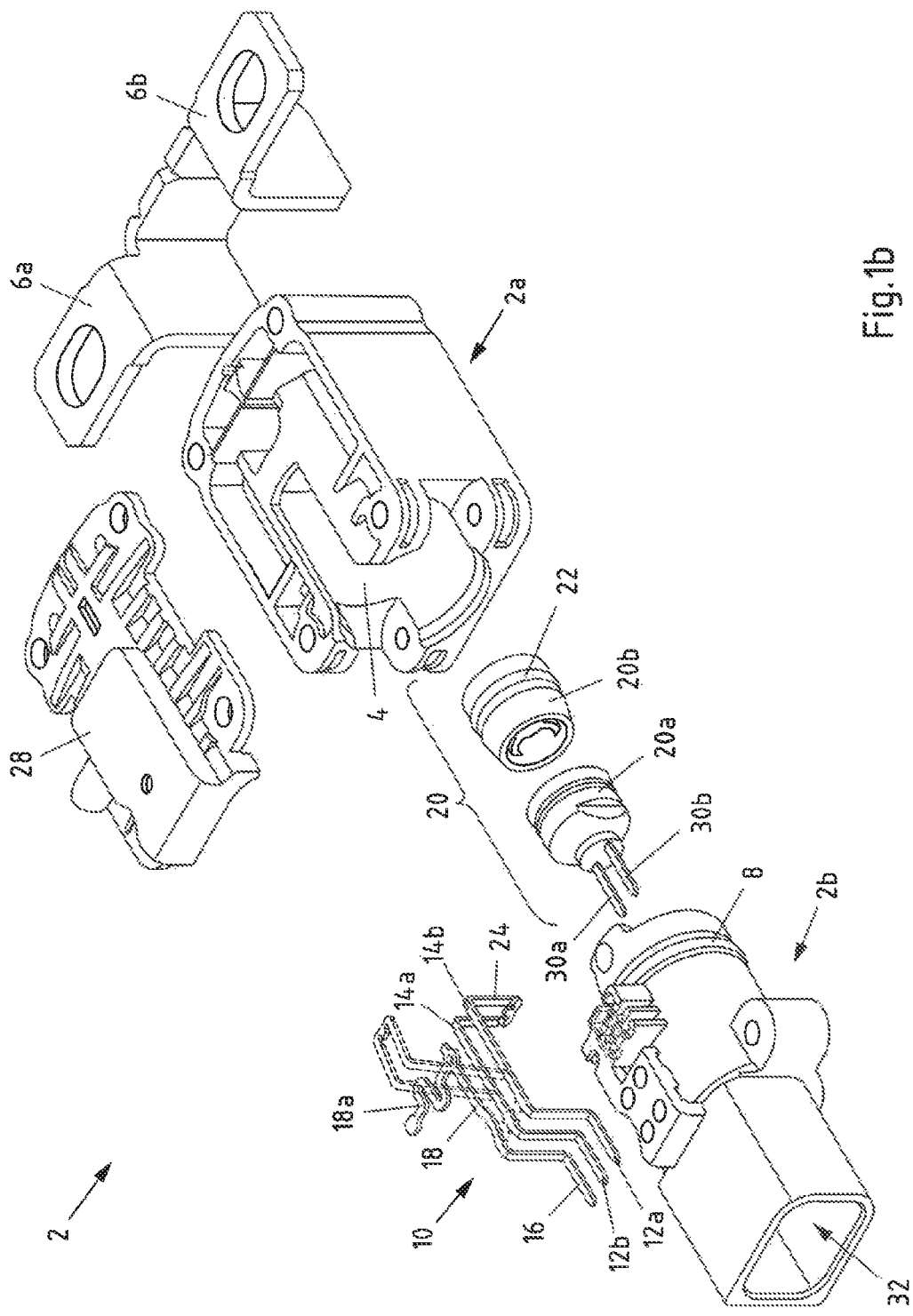
FIG. 1b an exploded view of a disconnecting device according to a further embodiment.

FIG. 1b shows an alternative embodiment. A punched grid 10 may be provided in or on the connecting element 2b. On the one hand, the punching grid 10 has two contact elements 12a, b and two connecting webs 14a, b. On the other hand, the punched grid 10 has a battery contact 16 with a connecting web 18. The connecting webs 14a, b, 18 are still connected to each other in the punching grid, but are subsequently separated, as will be shown. The connecting web 18 has a terminal lug 18a for connection to the terminal lug 6a.

In contrast to FIG. 1a, the contact elements 12a, b are formed integrally with the connecting point 24. This connecting point 24 may initially be bent upwardly away from the connection element 2b, as shown by the solid lines in FIG. 1b. After the actuator 20 has been inserted into the connecting element 2b, the joint 24 may be bent downwardly to contact the bolt 20b, as shown by the dashed lines.

In further contrast to FIG. 1a, in FIG. 1b the terminal lug is formed in a wave-shaped, s-shaped or otherwise bent in the longitudinal direction by at least two radii. In this way, tolerance compensation and elasticity can be established between the connecting web 18 on the one hand and the terminal lug 6a on the other hand.

Figure 6:
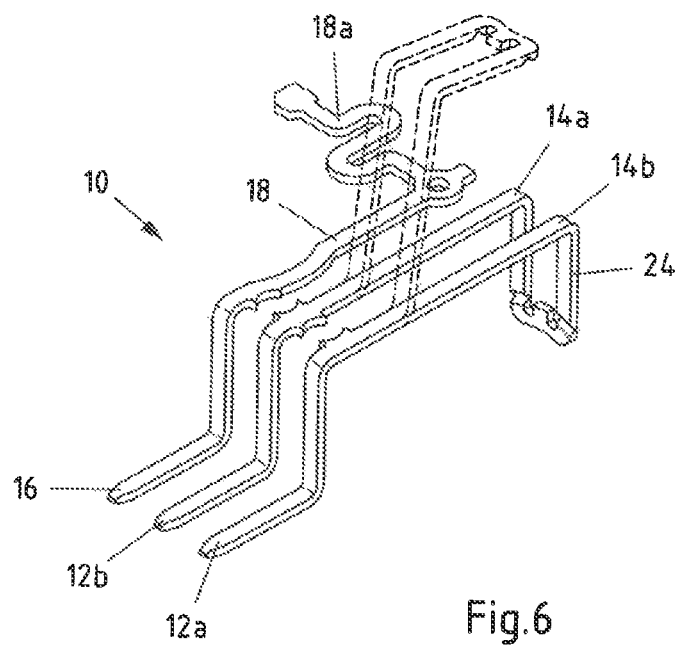
FIG. 6 a punching grid according to an embodiment.

The punched grid 10 is shown again in FIG. 6. Here, too, the wave form of the terminal lug 18a can be clearly seen.

The actuator 20 also has an actuator 20a in FIG. 1b. As in the configuration shown in FIG. 1a, the bolt 20b may be sleeved around the actuator 20a, partially receiving the actuator 20a. However, in contrast to FIG. 1, the bolt 20b may be formed without a groove 26 at its end face. For signal separation, the connecting point 24 is applied directly to the end face of the bolt 20b in the installed state.

Figure 7:
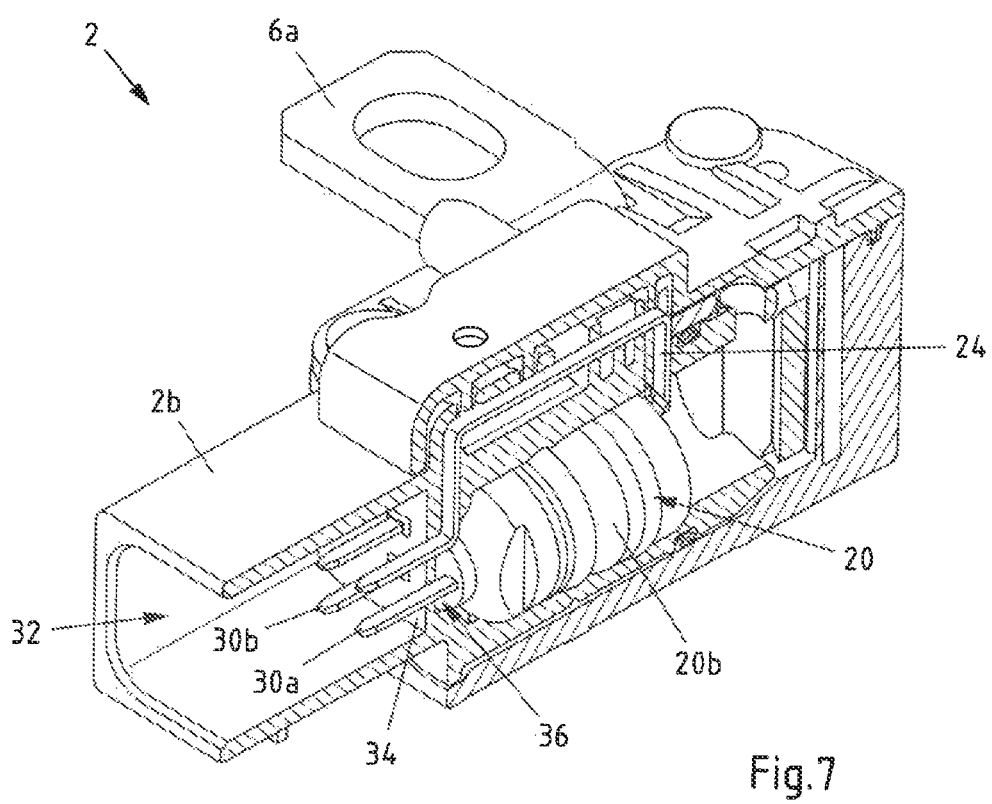
FIG. 7 a longitudinal section through a disconnecting device according to an embodiment.

In FIG. 7, it can be seen that in the installed state, the connecting point 24 is in contact with the end face of the bolt 20 and is not "trapped" in a groove.

Figure 2:
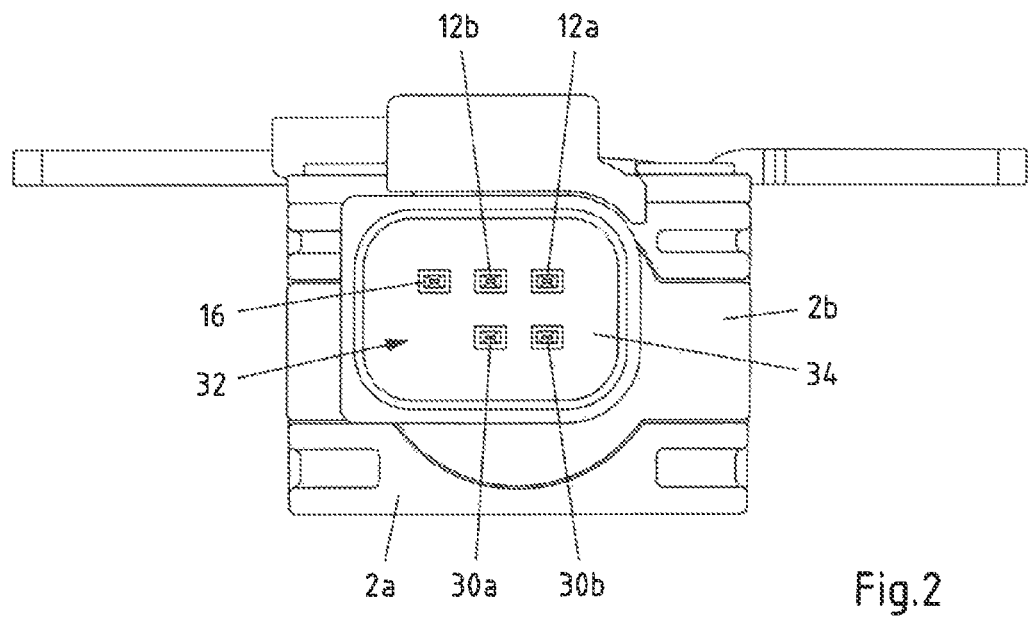
FIG. 2 a view of a plug-in contact on a connecting element according to an embodiment.

FIG. 2 shows the connection element 2b with the socket-shaped receptacle 32, where it can be seen that the terminals 30a, b the contact elements 12a, b and the battery contact 16 are arranged as contact pins. The spatial arrangement with respect to each other can be selected as desired.

Furthermore, it can be seen that the socket-shaped receptacle 32 is closed off by an internal center wall 34 in the through-opening of the connection element 2b. When reference is made here to a through opening, it is meant that an opening extends through the connecting element 2b which is interrupted by the center wall 34. In the center wall 34 are openings for at least the terminals 30a, b and additionally the contact elements 12a, b and/or the battery contact 16, so that the center wall 34 is pierced. For this reason, since the center wall 34 is not completely closed, the sealing element 22 is provided, which seals the actuator 2 and prevents gas from escaping from the channel 4 in the direction of the bushing-shaped receptacle 32 at the moment of disconnection.

Figure 3:
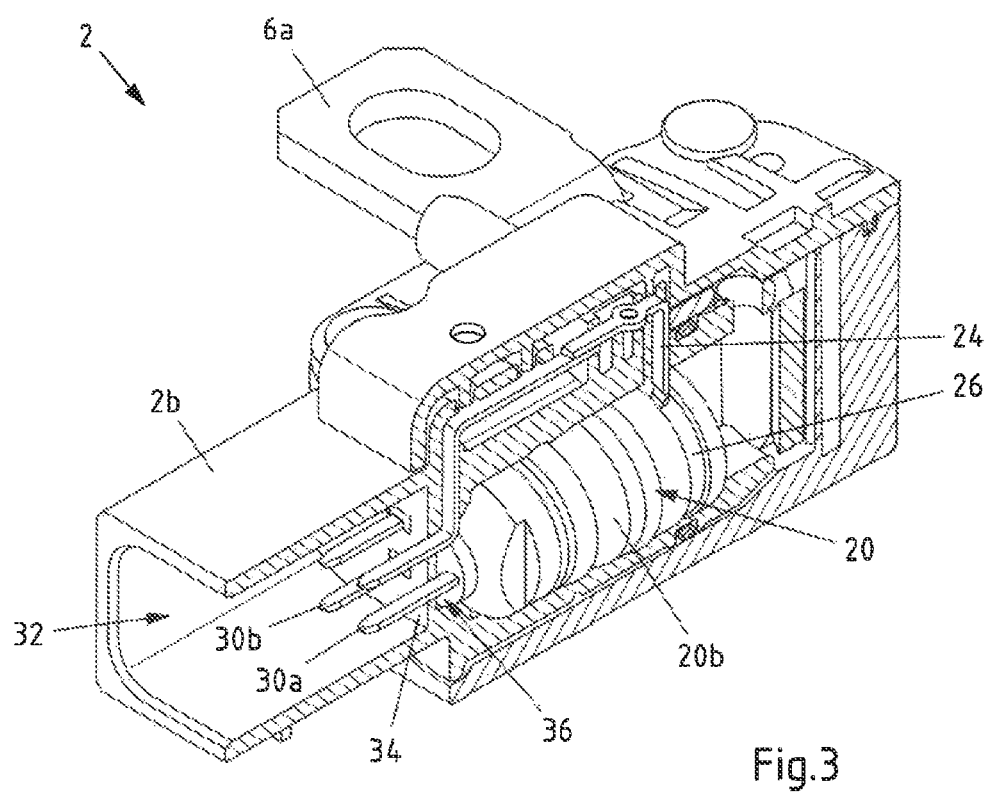
FIG. 3 a longitudinal section through a disconnecting device according to an embodiment.

FIG. 3 shows a disconnecting device 2 in a longitudinal section. In FIG. 3, it can be seen that the connecting element 2b has the bushing-shaped receptacle 32 on one side and a receptacle 36 for the actuator 20 on the other side. The receptacle 36 is separated from the bushing-shaped receptacle 32 by the center wall 34. Passing through the wall 34 are the ports 30a, b.

Through the longitudinal section it can be seen that the connecting element 2b has an inner receiving volume, in particular in the region of the bushing-shaped receiving 32. This volume is circumscribed by an outer lateral surface of the connecting element 2b. Running through the outer lateral surface are parts of the punched grid 10, so that the wires of the punched grid 10 are arranged, on the one hand, in the bushing-shaped receptacle 32 and, on the other hand, running in the longitudinal direction of the connecting element 2b on the outer lateral surface. In the longitudinal extension direction of the wires of the punching grid 10, the connecting point 24 is provided. In FIG. 3, it can be seen that the connecting point 24 projects beyond the connecting member 2b at the end face and is in engagement with the groove 26 of the bolt 20b.

Figure 5A:
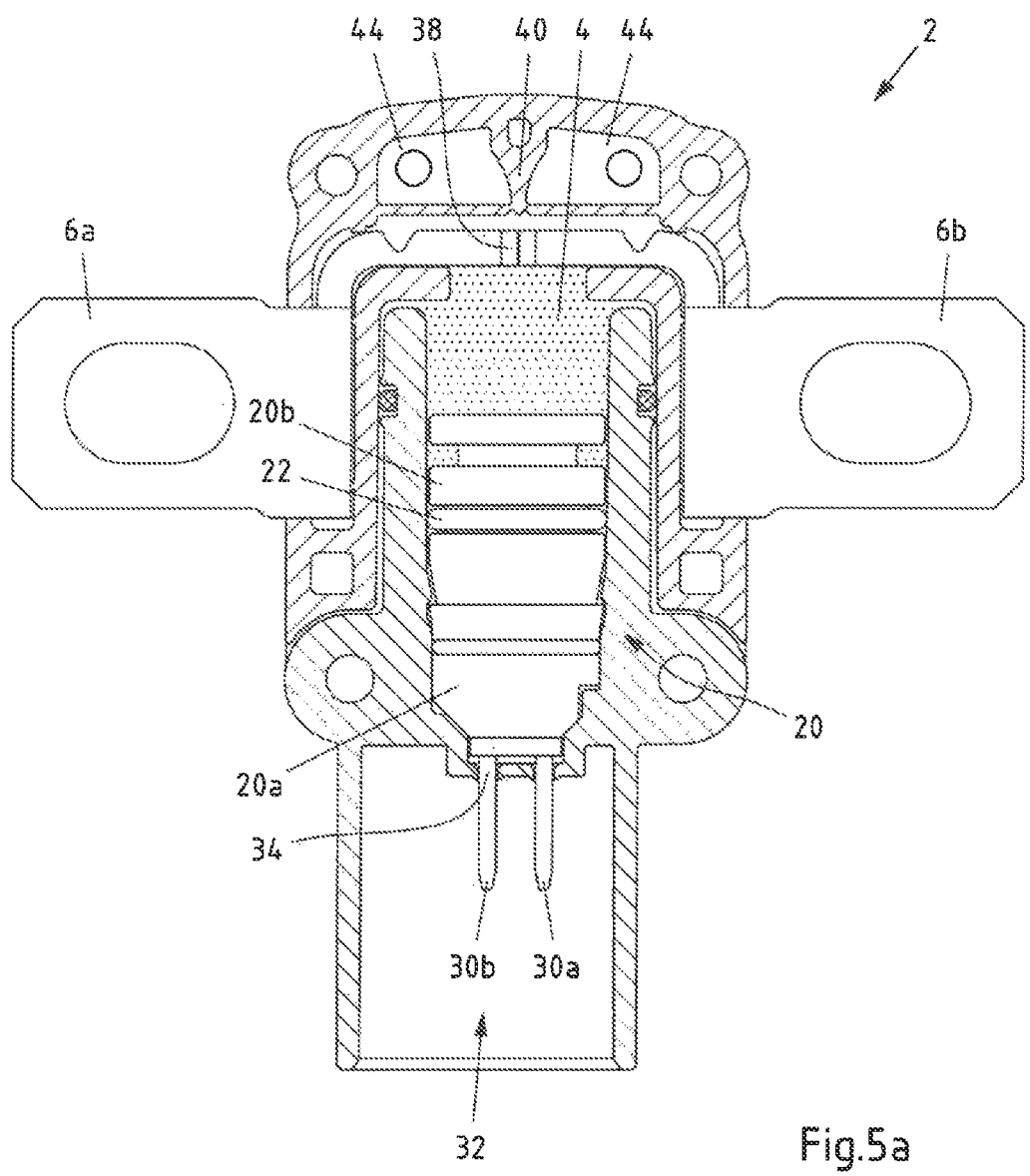
FIG. 5a, b a horizontal longitudinal section through a disconnecting device according to an embodiment.

FIG. 5a, b shows a horizontal longitudinal section through a disconnecting device 2. The actuator 20 with the pyrotechnic actuator 20a and the bolt 20b can be seen. The pyrotechnic actuator 20a and the bolt 20b are arranged on the side of the center wall 34 of the receiving volume of the connecting element 2b facing the channel 4. The receiving volume is closed off from the channel 4 by the sealing element 22. Protruding through the center wall 34 are the connections 30a, b, which are formed as connection pins in the bushing-shaped receptacle 32.

In the longitudinal direction of the duct 4 on the side of the duct 4 opposite the bolt 20b, the terminal lugs 6a, b extend towards each other and are connected to each other via a separation point 38.

Figure 5B:
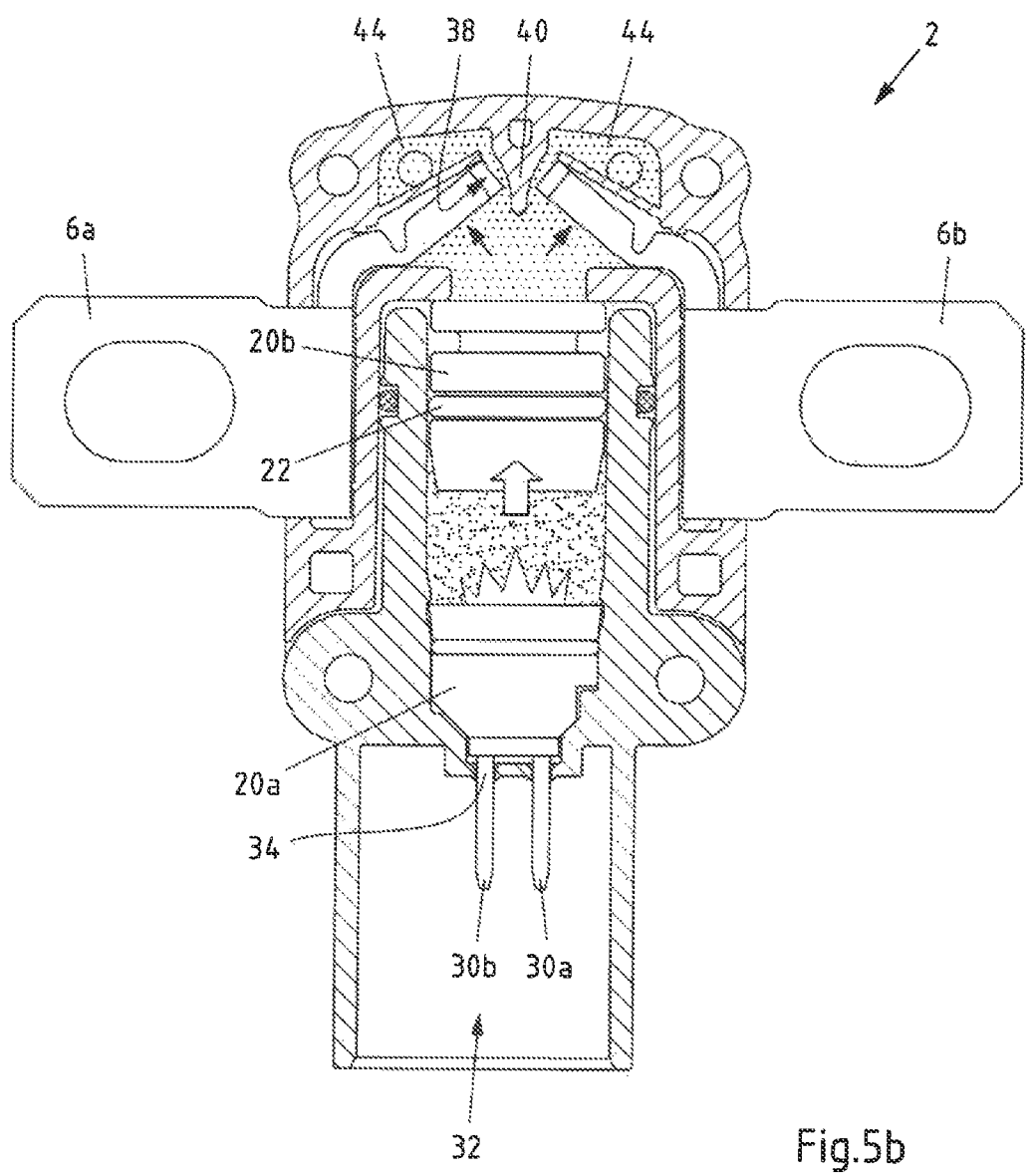

FIG. 5b shows the disconnecting device 2 according to FIG. 5a in the released state. The bolt 20b is accelerated in the direction of the separation point 38 by an electrical ignition of the pyrotechnic actuator 20a and the terminal lugs 6a, b are separated from each other at the separation point 38 and torn apart. The terminal lug 6a, b pivot away from the bolt 20b into a receiving volume 44, with a web 40 being provided in the receiving volume 44 that is located in the area that forms the gap of the terminal lug 6a, b when separated. Arc quenching is effected by this web 40. The web 40 may be in direct contact with the separation point 38 or longitudinally spaced therefrom.

In addition, a liquid or pasty medium, in particular an arc-quenching medium, is provided in the channel 4 in order to quench the arc formed between the terminal lugs 6a, b when they are separated under load, immediately upon separation.

In the following figures, the assembly of a disconnecting device 2 is described in the individual steps.

Figure 4A:
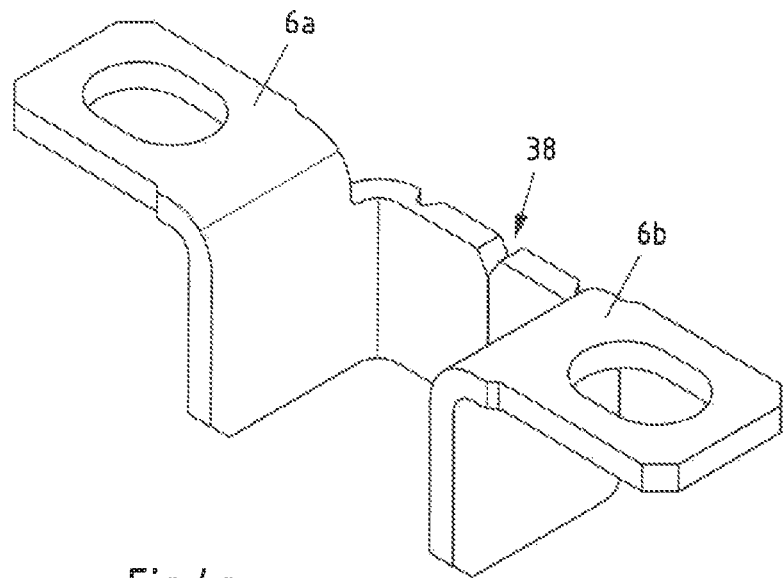
FIG. 4a-j process steps for assembling a subject disconnecting device according to an embodiment.

FIG. 4a shows the assembly of the terminal lugs 6a, b with each other. The terminal lugs 6a, b may be formed as forgings or as stamped bent surfaces. The terminal lugs 6a, b have an L-shaped profile both in cross-section and in longitudinal section. The terminal lugs 6a, b can be formed, for example, as bent flat parts or sheets. In this case, the terminal lugs 6a, b can be provided with connection bolts or through holes (shown in FIG. 4a). In a region in which the terminal lugs 6a, b project from the first housing element 2a in the assembled state, the terminal lugs 6a, b can run in a plane to be described as horizontal, preferably parallel to one another. In particular, the terminal lugs 6a, b run in the same plane. Subsequently, the terminal lugs 6a, b are bent in the direction of their surface normals in an area that is already located in the first housing element 2a and then run parallel to one another in a plane that can be described as vertical.

Finally, one leg of each of the terminal lugs 6a, b again runs parallel to the surface normal of the legs running in the vertical plane and there the legs of the terminal lugs 6a, b run towards each other and are connected to each other in the region of the separation point 38. This can be done by means of a soldered joint, a welded joint, an adhesive joint or the like.

Figure 4B:
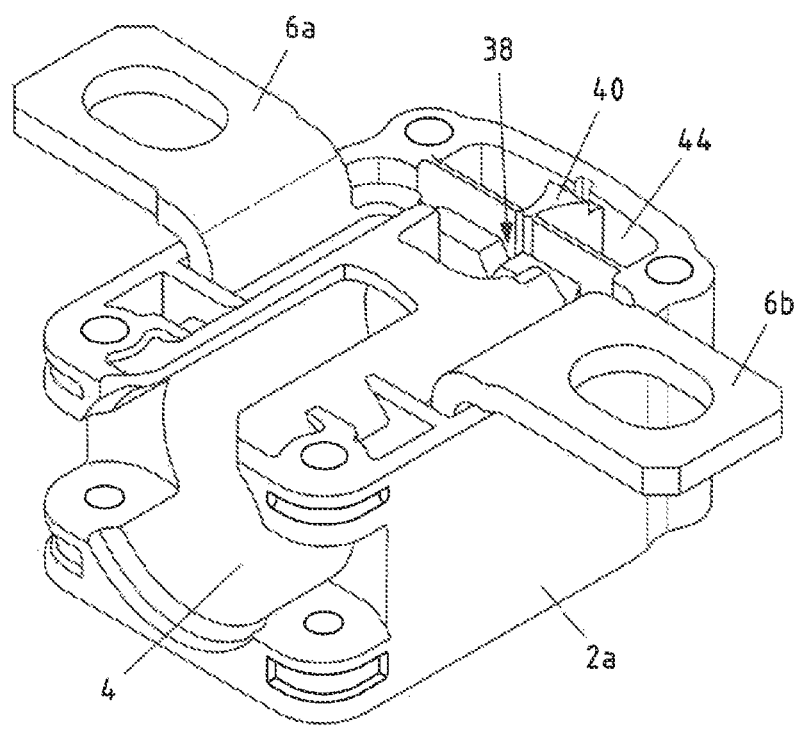

In addition to the terminal lugs 6a, b, the first housing part 2a is formed as shown in FIG. 4b. In this regard, the first housing part 2a may be formed as an injection molded part. The first housing member 2a may form a channel 4 extending from an end face of the first housing member 2a toward the separation point 38. The first housing element 2a may provide receptacles for the terminal lugs 6a, b such that the terminal lugs 6a, b may be inserted into these receptacles when connected. On the side of the terminal lugs 6a, b facing away from the channel 4, a receiving volume 44 is formed in the first housing element 2a. Centrally of the receiving volume 44, the web 40 points in the direction of the separation point.

Figure 4C:
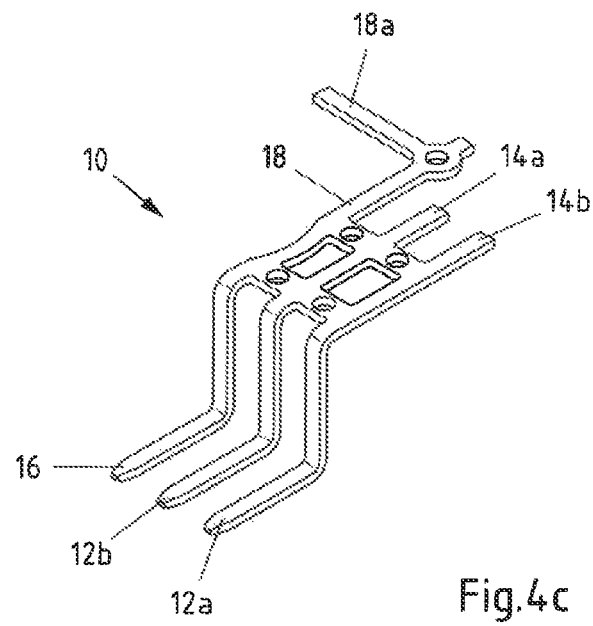

The punched grid 10 may be formed as shown in FIG. 4c. The punched grid 10 may be formed of three legs, two legs extending parallel to each other and a central leg connecting these two parallel legs. On a first leg, the punched grid 10 has the contact elements 12a, b and the battery contact 16. These three elements, formed as pins, are connected via a central leg, which runs perpendicular to the first leg, to a further leg, which also runs perpendicular to the central leg. The connecting webs 14a, b and the connecting web 18 are formed on the further leg. On the connecting web 18 is a terminal lug 18a, which will be used for connection to the terminal lug 6a.

The webs 14a, b, 18 are still electrically conductively connected to one another in the punched grid 10, but this electrically conductive connection is severed in the further course of assembly so that the contact elements 12a, b and the battery contact 16 are electrically isolated from one another.

The stamped grid 10 can also be shaped as shown in FIG. 6.

Figure 4D:
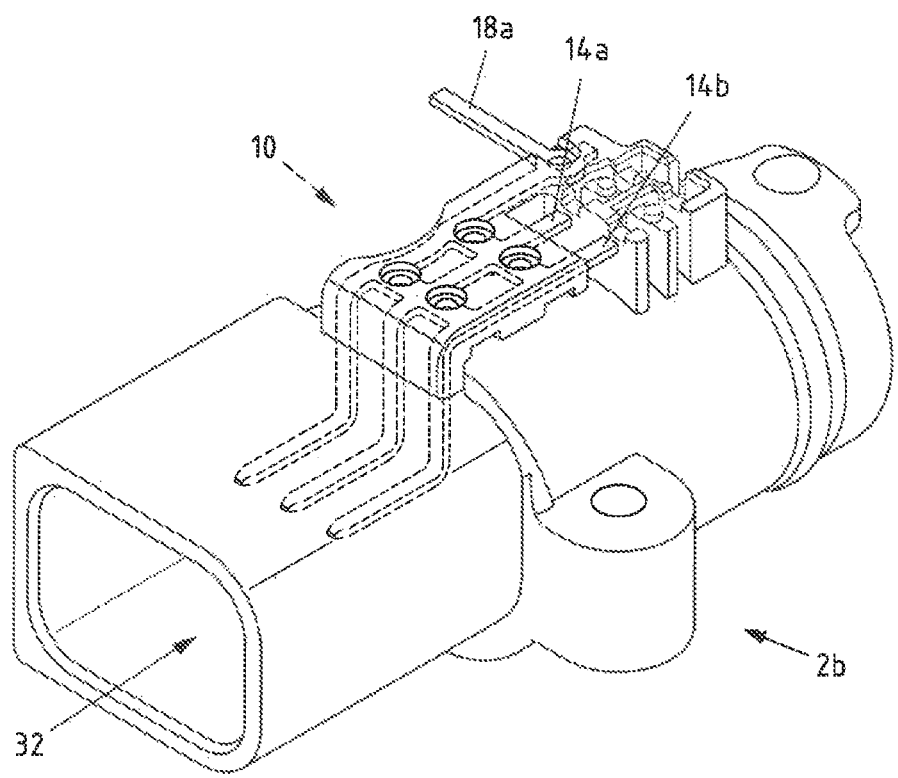

FIG. 4d shows the connection element 2b. The connection element 2b has the bushing-shaped receptacle 32. To produce the connection element 2b, the stamped grid 10 can be overmolded with a plastic so that the shape of the connection element 2b is formed and the stamped grid 10 is enclosed therein. It can be seen that the webs 14a, b, 18 extend along the outer lateral surface of the connecting element 2b, in particular along the longitudinal axis. The terminal lug 18 protrudes from the connecting element 2b.

Figure 4E:
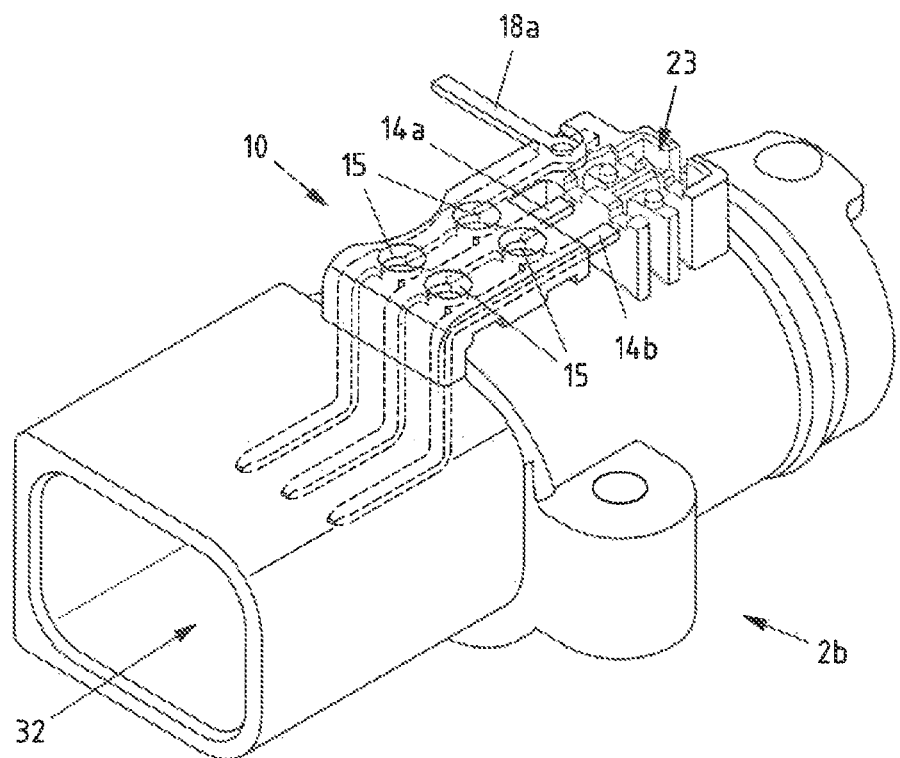

FIG. 4e shows the connecting element 2b. It can be seen that the conductive connections between the webs 14a, b, 18 are electrically insulated from each other. This can be done by using openings 15 by means of drilling, milling or laser to break the connection between the wires of the punched grid 10. The outer lateral surface of the connection element 2b is perforated in the area of the end facing in the channel 4 and is provided with receptacles 23 for the connecting point 24 formed as a wire bridge.

Figure 4F:
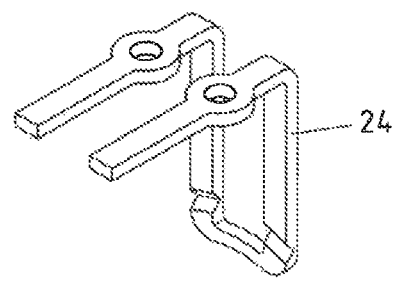

FIG. 4f shows the connecting point 24 formed as a wire bridge, which can also be formed as a punched grid. If the stamped grid 10 is formed as shown in FIG. 6, the connecting point 24 may be formed integrally therewith.

Figure 4G:
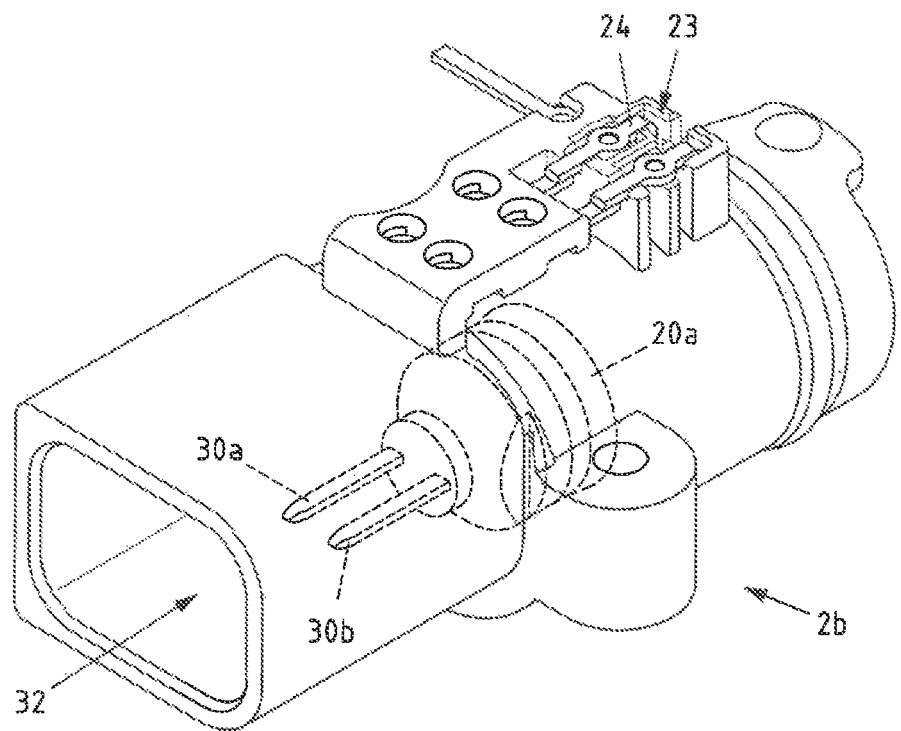

FIG. 4g shows the connecting element 2b with the pyrotechnic actuator 20a inserted. It can be seen that the pyrotechnic actuator 20a is received in the receiving volume of the connecting element 2b and its connections 30a, b are guided into the bushing-shaped receptacle 32. In the receptacle 23, the connecting point 24 may be inserted or bent in, but this may also be done in a later step.

Figure 4H:
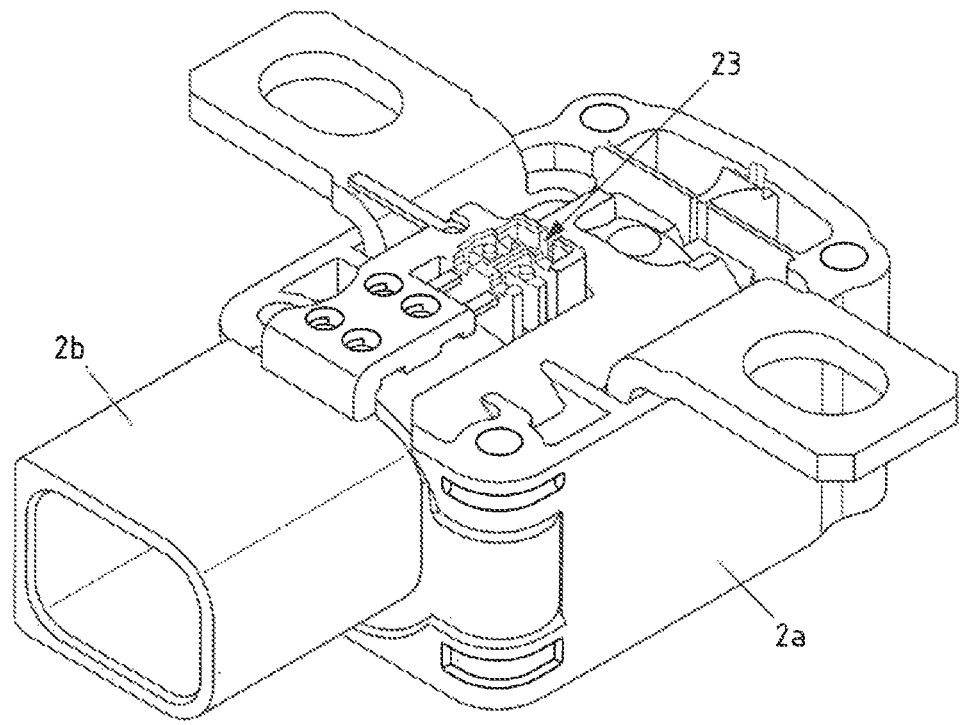

FIG. 4h shows how the connecting element 2b is inserted into the first housing element 2a. The two housing elements 2a, b close the channel 4.

Figure 4I:
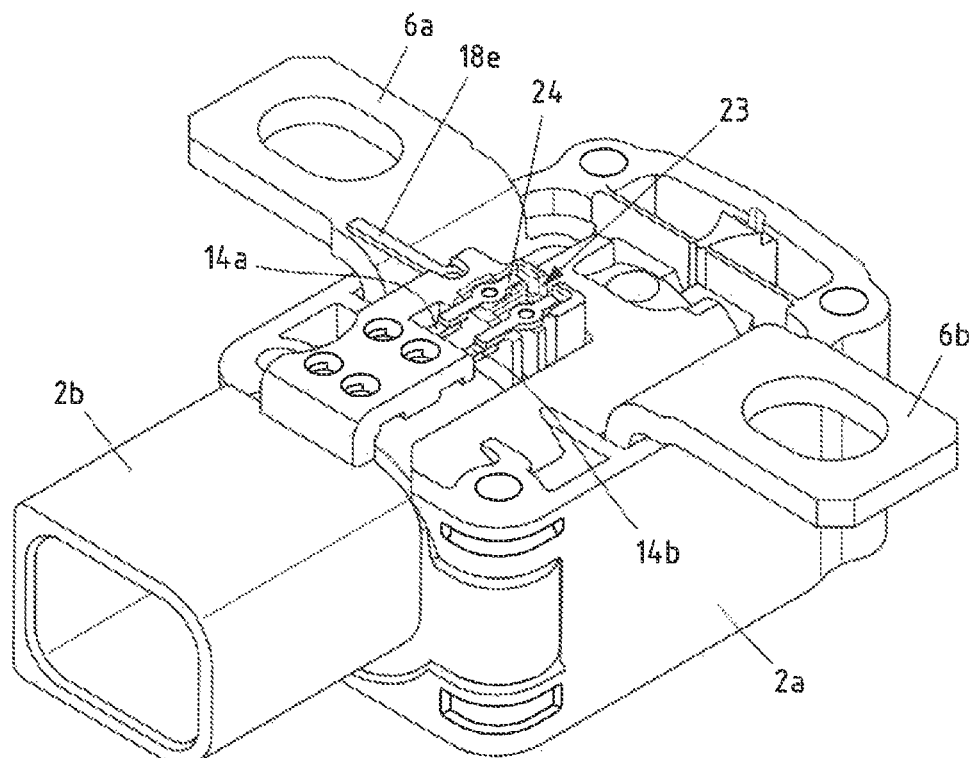

Then, as shown in FIG. 4i, the connecting point 24 can be provided, which is inserted or bent into the receptacle 23 on the connection element 2b. The receptacle 23 may be provided with alignment pins so that the jumper 24 is properly mounted therein and aligned with the webs 14a, b.

The webs 14a, b may then be soldered or welded to the connector 24. Simultaneously, or staggered with respect thereto, the terminal lug 18a may be welded or soldered to the terminal lug 6a.

Figure 4J:
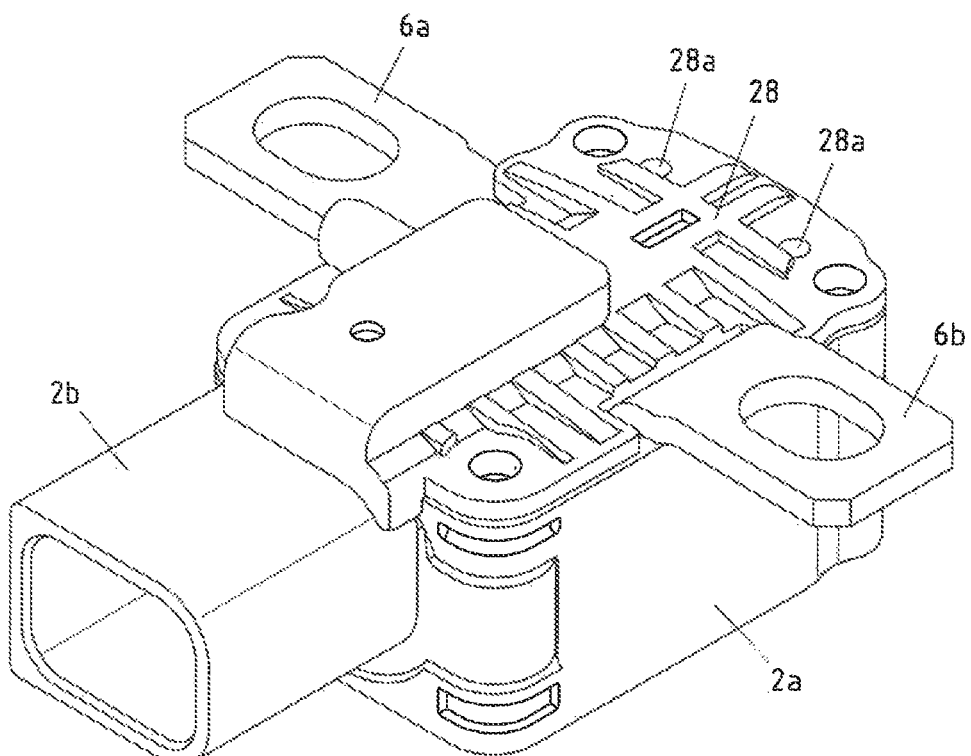

Finally, as shown in FIG. 4j, the cover 28 is placed on the housing elements 2a, b so that the channel 4 is completely closed. A pasty, liquid or gaseous medium can be filled into the channel 4 through filling openings 28a. These filling openings can then be closed and the disconnecting device 2 is completely assembled.

LIST OF REFERENCE SIGNS 2 disconnecting device
2a first housing element
2b connecting element
4 channel
6a, b terminal lugs
8 sealing element
10 punched grid
12a, b contact elements
14a, b connecting bars
15 opening
16 battery contact
18 connecting bar
18a terminal lug
20 actuator
20a pyrotechnic actuator
20b bolt
22 sealing element
23 mounting
24 joint
26 groove
28 cover
30a, b connections
32 female receptacle
34 center wall
36 receptacles
38 separation point
40 bar
44 receiving volume

What is claimed is:

1. An electrical disconnecting device comprising:
 a housing;
 a first terminal lug inserted into the housing;
 a second terminal lug inserted into the housing;
 a separation point forming a current path between the first and second terminal lugs in a closed state and located spatially between the terminal lugs, wherein the separation point separates the current path between the terminal lugs in a separated state;
 an actuator influencing a disconnection of the separation point;
 a channel formed in the housing between the actuator and the separation point, the actuator closing the channel on a side facing away from the separation point; and
 a connecting element arranged on a side of the actuator facing away from the channel, which accommodates at least two electrical connections of the actuator, wherein
 the connecting element accommodates at least two contact elements of a switching path,
 the contact elements are each guided into the channel via connecting webs and are short-circuited to one another in the channel at a connecting point, in such a way that when the actuator is triggered, the connecting point is moved away from the contact elements, so that the connecting webs are mechanically disconnected, and
 wherein the housing is multipart, at least the terminal lugs and the separation point being arranged in a first housing part and the channel being formed at least partially by the first housing part and the connecting element forming a second housing part.

2. The electrical disconnecting device according to claim 1, wherein the connecting element accommodates a battery contact,
 the battery contact is short-circuited to one of the terminal lug via a connecting web.

3. The electrical disconnecting device according to claim 1, wherein the connecting element is a plug contact, in particular a plug or a socket.

4. The electrical disconnecting device according to claim 1, wherein the connecting element is inserted into the channel, radially sealing the channel.

5. The electrical disconnecting device according to claim 1, wherein
 the connecting element has a through-opening extending in the longitudinal direction, and
 the actuator is arranged in the through-opening, radially sealing the through-opening.

6. The electrical disconnecting device according to claim 1, wherein a flowable medium, in particular a gel-like medium, is arranged in the channel between the actuator and the separation point, and wherein the medium flows around the separation point immediately upon separation of the latter.

7. The electrical disconnecting device according to claim 1, wherein the terminals, the contact elements and/or the battery contact are arranged as contact pins within the connection element.

8. The electrical disconnecting device according to claim 1, further comprising a bolt movable along the channel arranged between the actuator and the separation point in the channel, and wherein the connecting point is arranged on the bolt in a form-fitting manner.

9. The electrical disconnecting device according to claim 8, wherein the bolt has a radial recess, in particular a groove, and in that the connecting point is arranged in the recess, and in that the connecting webs are arranged at an angle to the recess, in particular in the longitudinal direction of the channel on the housing.

10. The electrical disconnecting device according to claim 1, wherein the contact elements and the connecting point are installed in the connection element independently of one another, and in that the contact elements and the connecting point are connected to one another after being installed in the connection element.

11. The electrical disconnecting device according to claim 1, wherein the actuator is a pyrotechnic ignition pellet.

12. A system comprising the disconnecting device according to claim 1 and at least two automotive battery cables, wherein a first battery cable is connected to the terminal lug and a second battery cable is connected to the second terminal lug.

13. A method of manufacturing a disconnecting device comprising:
 inserting a first terminal lug and a second terminal lug into a housing, wherein a separation point is spatially located between the terminal lugs and the terminal lugs form a current path in a closed state;
 inserting an actuator causing a separation of the separation point into the housing, such that the actuator closes a channel formed in the housing between the actuator and the separation point on a side facing away from the separation point; and
 arranging connections of the actuator in a connecting element on a side facing away from the channel;
 arranging at least two contact elements of a switching path in the connecting element, wherein the contact elements are each guided into the channel via connecting webs and are short-circuited to one another in the channel at a connecting point, and the connecting point is arranged on the actuator such that, when the actuator is triggered, the connecting point is moved away from the contact elements, so that the connecting webs are mechanically disconnected, and
 wherein the housing is multipart, at least the terminal lugs and the separation point are arranged in a first housing part and the channel is formed at least partially by the first housing part and the connecting element is provided as second housing part.

14. The method according to claim 13, further comprising forming the contact elements and/or the battery contact from a common stamped grid, the stamped grid being at least partially separated after being arranged in the connecting element.

* * * * *